Dec. 29, 1942. J. T. KLINE Re. 22,240

APPARATUS FOR PRODUCING WOUND PACKAGES

Original Filed May 14, 1937 3 Sheets-Sheet 1

Inventor:
JAMES T. KLINE

By John M. Leach
Attorney

Dec. 29, 1942. J. T. KLINE Re. 22,240

APPARATUS FOR PRODUCING WOUND PACKAGES

Original Filed May 14, 1937 3 Sheets-Sheet 2

Inventor:
JAMES T. KLINE

By John M. Leach
Attorney

Dec. 29, 1942. J. T. KLINE Re. 22,240

APPARATUS FOR PRODUCING WOUND PACKAGES

Original Filed May 14, 1937 3 Sheets-Sheet 3

INVENTOR
James T. Kline.
BY
John M. Leach
ATTORNEY

Reissued Dec. 29, 1942

Re. 22,240

UNITED STATES PATENT OFFICE 22,240

APPARATUS FOR PRODUCING WOUND PACKAGES

James T. Kline, Fairfield, Conn.

Original No. 2,214,332, dated September 10, 1940, Serial No. 142,580, May 14, 1937. Application for reissue September 8, 1941, Serial No. 410,110

35 Claims. (Cl. 18—8)

This invention relates to a means for controlling the tension in the material being wound in accordance with the diameter of the wound mass without physically contacting the material.

An object of the invention is to provide a control dependent upon the size of the wound package which will regulate the speed ratio between the linear speed of the material being wound up and the linear speed of the material as it is being fed to the winding means, and thus control the tension in the material.

A further object of the invention is to provide an indicator which will indicate that the package has acquired a predetermined size and that the feed should be shifted to the next package without having any elements in physical contact with the material.

Another object of the invention is the method of producing wound packages of artificial silk in which the tension in the material is increased to improve its dyeing properties, maintained uniform, or decreased to produce a fluffy package to improve its washing properties by controlling the feeding and taking up of the material, the control being in accordance with the changing diameter of the material on the package.

More specifically the invention is applied to an artificial silk spinning machine in which the spinning solution is fed by a motor-driven pump through a coagulating solution, formed into a thread and wound upon a bobbin. The bobbin is rotated at a constant axial speed and as the package is wound up the linear speed of the material being wound constantly increases due to the increase in diameter of the package. The feeding means must be operated at a variable speed to compensate for this change in linear speed. If a package with uniform tension is desired, the speed of the pump will be increased to exactly compensate for the change in linear speed of the take-up. If a package with increasing tension is desired so as to obtain better dyeing properties, the speed of the pump will be varied so that the change in feed will not quite compensate for the increase in the linear speed at the take-up and will thus impose a gradually increasing tension on the material. If a package with decreased tension is desired, the pump will be operated to change the linear speed of the material being fed at a greater rate than the change of linear speed at the takeup and thus decrease the tension in the material.

The prior practices for controlling the tension in the material have been to have an element contact the material and thus control the feed or to have gearing interposed between the take-up and the feeding means which changes the speed ratio between the two in a predetermined cycle during operation of the machine. The first method is objectionable in that it applies an undesirable rubbing action on the filaments which tends to injure them. The second method is objectionable in that should the material cease feeding the speed ratio would continue to change in its cycle and the ratio between the two would be improper when the winding is resumed. According to the present invention, however, a light-sensitive cell is placed adjacent the winding package and a light-source is focused on the cell in such a manner that as the package increases in diameter it intercepts the rays from the light source. This causes the current in the light-sensitive cell to decrease in accordance with the amount of light blocked off. The cell is connected in the control circuit for the feeding device or pump so as to vary its speed in accordance with the current in the cell.

From the above it will be apparent that the speed of the feed device will be controlled in accordance with the diameter of the wound package without any physical contact with the material being wound and always in a proper ratio to the size of the wound package and consequently the linear speed of take-up.

The invention will best be understood from the following description of specific embodiments of the same when taken in conjunction with the accompanying drawings in which.

Figure 1:
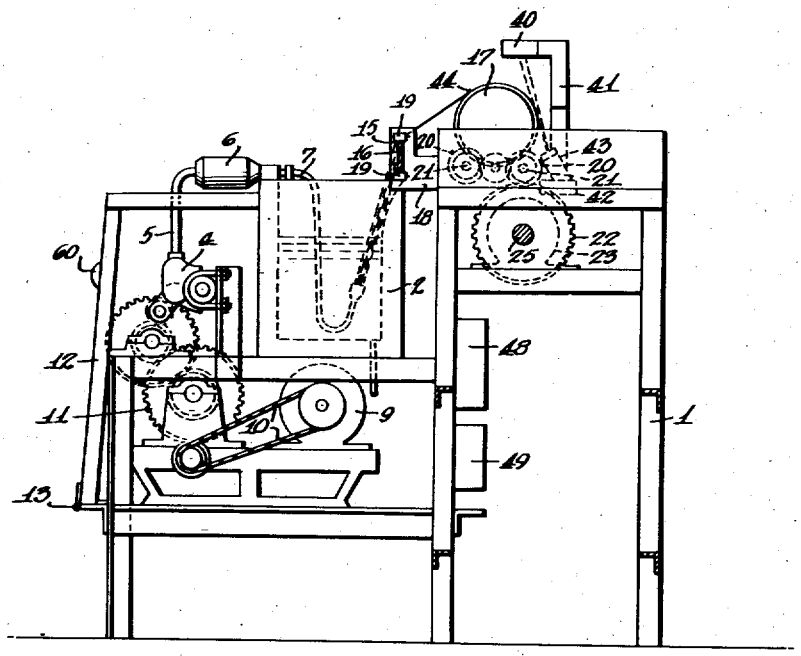
Fig. 1 is a side view of a section of the machine taken along line 1—1 of Fig. 4.

The invention will be described as applied to an artificial silk spinning machine. The particular spinning apparatus shown in the drawings and described in this specification is of the type adapted to produce rayon by the viscose process. However, it should be borne in mind that the spinning apparatus is shown for purposes of illustration only and that the invention may be applied to other types of spinning or other machines in which it is desired to wind material and control the tension in the material in accordance with the diameter of the wound package without physically contacting the material.

Without going into details of construction of the spinning apparatus shown in the drawings, it comprises in general a framework 1 upon which is supported a tank 2 containing a coagulating or precipitating bath 3 of suitable well-known composition. A gear pump 4 forces viscose solution through a pipe 5 to a filtering device 6 from which it passes through a goose-neck 7 to a spinneret 8 beneath the surface of the bath 3. The pump 4 is driven by a motor 9 through chain 10 and suitable gearing 11. All of this structure is mounted on frame 1 midway between bobbins 17, 17a as is shown by the position of the filter device 6 in Fig. 4 and is duplicated throughout the length of the machine for each pair of bobbins. A door 12 is hinged at 13 and extends along the machine and encloses the gearing and other mechanism.

The filament-like jets of viscose which issue from the spinneret 8 are coagulated by the precipitating bath 3 and are gathered into a thread that passes through guide 15 on a longitudinally movable traverse bar 16 to bobbin 17 or 17a, as will be later described, and wound into a package. The traverse bar is mounted in brackets 18 on rollers 19, 19 and is reciprocated in a manner to be later described.

Figure 4:
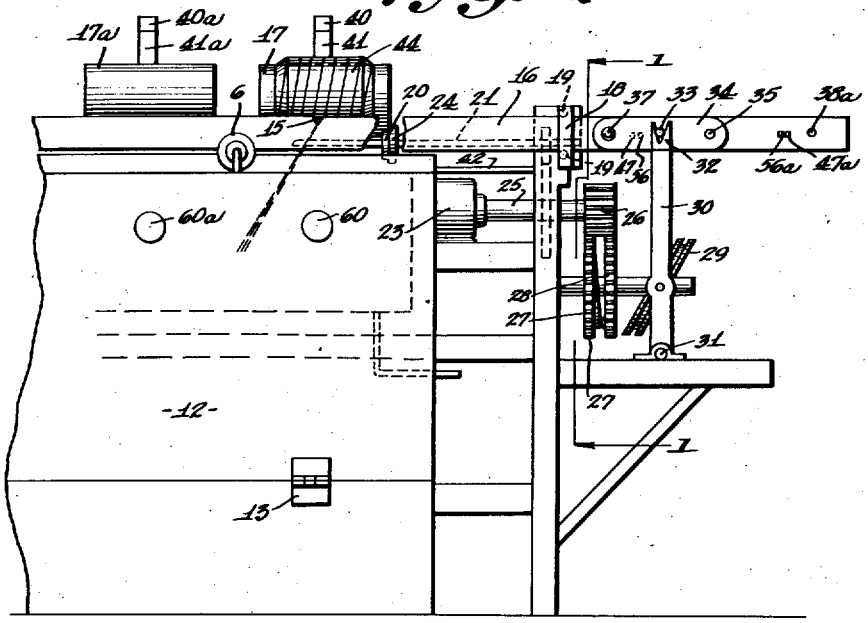
Fig. 4 is a front view of the machine, partly in section, showing but one unit of a multiple machine.

The bobbins 17 and 17a are supported at each end by a pair of rollers 20 mounted on shafts 21 which are driven by gears 22 from motor 23. As shown in Fig. 4, the rollers are mounted on shafts 21 and have flanges 24 which contact the ends of the bobbins to prevent axial movement of the bobbin.

The means for reciprocating the traverse bar 16 is driven by the motor 23 through gear 26 mounted on motor shaft 25. Gear 26 engages gears 27 and 28 which operate the cam 29 in the manner fully described in U. S. Patent 109,708 to oscillate the member 30 about its pivot 31. The member 30 has a bifurcated end 32 which engages pin 33 on a handle 34 which is pivoted to the traverse bar 16 at 35.

It will be noted in Fig. 4 that while both bobbins are rotating, only one of the pair of bobbins is being used for winding. When that bobbin is filled the traverse bar is shifted so that the guide 15 on the bar leads the thread to the reserve bobbin. In this manner the winding may be continued without having to stop the machine to change bobbins. The manner of changing or shifting the thread from one bobbin to the other will now be explained.

When it is desired to shift the traverse from bobbin 17 to 17a, the operator removes the spring-pressed locking pin 37 from an aperture similar to 38a in the traverse bar 16 and pivots handle 34 about pivot 35 and removes pin 33 from the fork 32 of member 30. He then manually moves the traverse bar 16 until aperture 38a is in the same position as was pivot 35. The handle 34 is then lowered so as to register pin 33 with fork 32 and the locking pin 37 engages aperture 38a, and the guide will then traverse the thread along bobbin 17a.

Figure 5:
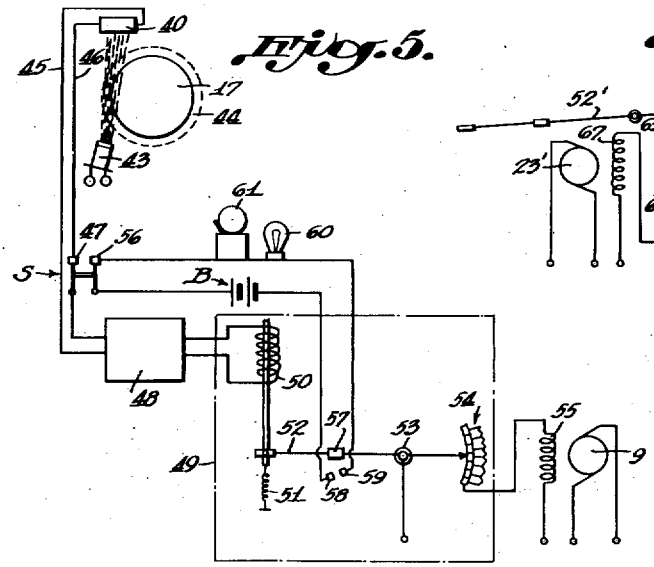
Fig. 5 is a diagrammatic view of one form of controlling circuit.

The controlling mechanism for the machine comprises a light-sensitive cell 40 mounted on a bracket 41. The light-sensitive cell may be of any suitable type capable of changing the current in the cell in accordance with its illumination. Bracket 41 is carried by a bar 42 extending along the machine. Secured to bracket 41 is a light source 43 with its beam focused on the light-sensitive cell. As shown in Figs. 1, 4, and 5, an attachment is provided for each bobbin and is positioned adjacent the bobbin in such a manner that the package as it increases in size will intercept the rays of light from the light-source. This decreases the illumination of the light-sensitive cell and thus decreases the current in the cell. The cell is connected by wires 45, 46 through contact 47 of switch S, to be later described, to an amplifier 48 which amplifies the current in the cell. The amplifier is connected to a controller box 49 which contains solenoid or other current responsive device 50 which acts against spring 51 to move the arm 52 (pivoted at 53) in proportion to the current in the light-sensitive cell to control rheostat 54 in the field 55 of pump motor to regulate the speed at which the thread is fed to the bobbin.

Motor 23, in this embodiment of the invention, is a constant speed motor. Bobbins 17 and 17a are therefore driven at a constant axial speed. The thread will be taken up by the bobbins at a constantly increasing linear speed as the diameter of the bobbins increase. The feed means must therefore be adjusted to compensate for this increase in linear speed so as to maintain the desired tension in the material. This is done by selecting a proper resistance 55 in the field of the feed motor and varying it to accurately control the speed of the same. If desired the feed may be adjusted to gradually increase the tension in the material so as to produce a package which has better dyeing properties, may be adjusted to maintain a uniform tension in the material, or may be adjusted to gradually decrease the tension in the material so as to produce a fluffy package more suitable for washing. Further it is pointed out that the controlling mechanism does not include any element which contacts the package to determine its size and which would, if used, cause undue rubbing on the material which is fragile and very easily broken.

Figure 2:
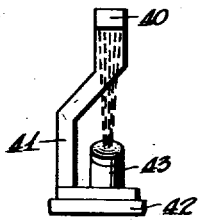
Fig. 2 is a front elevation of the control attachment.
Figure 3:
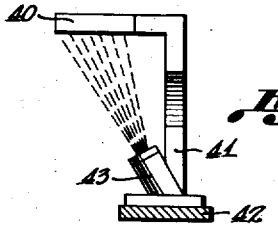
Fig. 3 is a side elevation of the control attachment.

As shown in Fig. 4 each bobbin has a control unit mounted adjacent thereto. These units are shown in detail in Figs. 2 and 3. It will be noted that the cell faces downward and is shielded from the usual overhead lights used in the building. If desired the bottom may be shielded except for a slit which will let rays from the light 43 fall on the cell. Switch S mounted on the handle 34 has a contact 47 to connect either unit with the amplifier when the feed is changed to that bobbin by the shifting of the traverse bar. Switch S also has a contact to connect contacts 56 and 56a in the signal circuit for the bobbins 17 and 17a. This signal is operated by a contact 57 on arm 52 which bridges contacts 58, 59, when the arm has moved into the position it occupies when a full package has been attained and closes the circuit from battery B to lamp 60 and 60a and an audible alarm as at 61. This indicates to the operator that the package has acquired its full size and that the traverse should be shifted to the next bobbin. It will be seen therefore that the control unit and signal unit for each bobbin is put into operation automatically when the traverse is shifted.

In the above description the speed of the feeding means has been varied while the speed of the take-up has been maintained constant. The same results obviously can be obtained by feeding the material at a constant speed and taking it up at a variable speed. This would involve only the shifting of the control rheostat from the field circuit of the pump motor to the field circuit of the take-up motor.

Also the shifting of the traverse or feed from one bobbin to another may be done automatically and the circuit made to give the signal could initiate the mechanism for making the change over. The signal circuit may also operate a stopping mechanism when the package has acquired its proper size.

Also if desired a godet wheel may be geared to the pump or feed motor to assist in feeding the filaments to the take-up means and have its speed varied with variations in the speed of the pump or feed motor.

Figure 6:
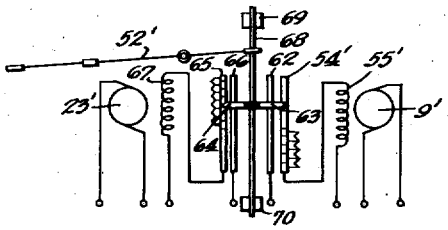
Fig. 6 is a diagrammatic view of a modified form of controlling circuit.

The modification in Fig. 6 shows the control being split between the winding or take-up motor and the feeding motor. In this modification arm 52' is actuated by the solenoid as in the former disclosure. It moves member 68 mounted to slide in bearings 69, 70 through a pin and slot connection. Member 68 carries contacts 63 and 64 which bridge contacts 62, 54' and 65, 66 as shown. Contacts 54' and 65 are connected in the fields 55' and 67 of motors 9' and 23' and are formed as shown in Fig. 6 with one half of their length as a variable resistance. They are arranged so that during one half of the movement of member 68 the resistance in the field of one motor will vary and during the second half of the movement of member 68 the resistance in the field of the other motor will vary. This will result in the speed of the first motor being varied during the first half of the winding operation and then running at a constant speed; and the second motor running at a constant speed during the first half of the winding operation and at a variable speed during the second half.

Figure 7:
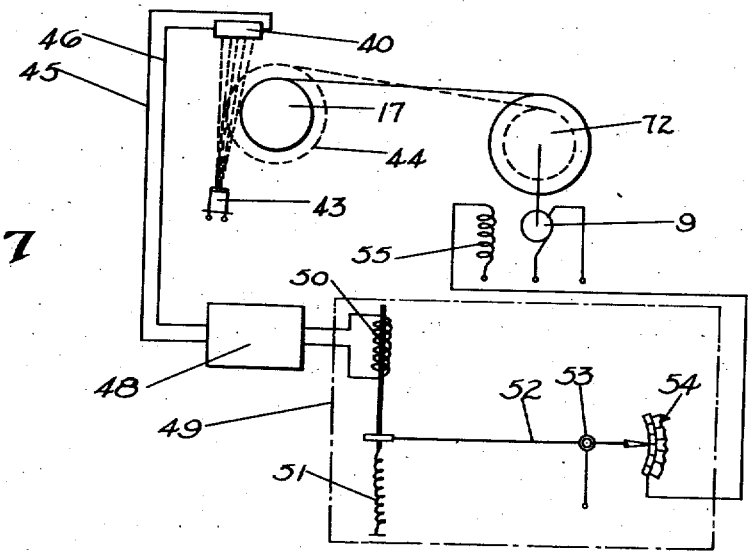
Fig. 7 is a diagrammatic view of the modification of Fig. 5 when adapted for winding material from one holder or supply source to another holder or receiving roll.

The modification of the invention illustrated in Fig. 7 is the same as that illustrated in Fig. 5 with the exception that the motor 9 is suitably connected to drive a supply roll 72 bearing elongate material which is wound upon the bobbin or other receiving roll 17. As the effective diameter of the bobbin or other receiving roll 17 increases so as to increase the peripheral speed of the receiving roll, the peripheral speed of the supply roll 72 is progressively increased so as to maintain the material being wound under substantially no tension or under a uniform tension.

Figure 8:
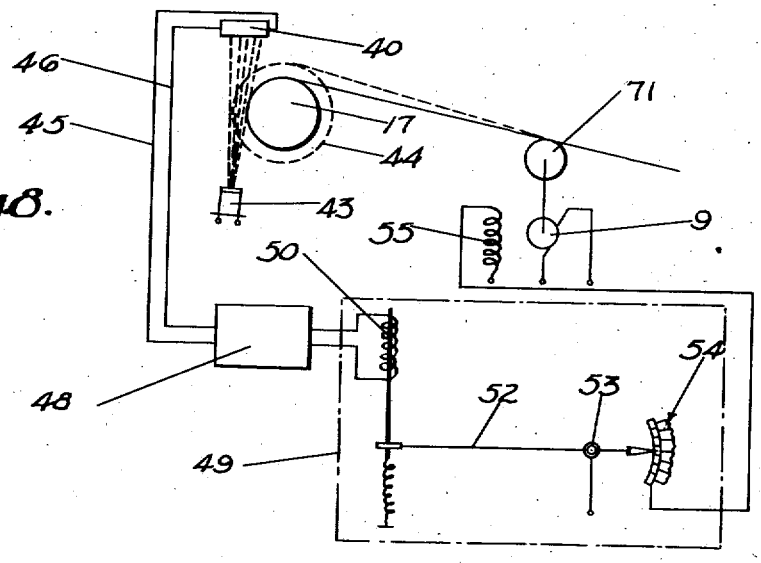
Fig. 8 is a diagrammatic view of the modification of Fig. 5 when adapted for winding material from a supply roll by means of an advancing roll to a receiving roll.

The modification illustrated in Fig. 8 is the same as that illustrated in Fig. 5, except that the motor 9 is suitably connected with a roll 71 so as to drive the same and to supply elongate material from a suitable supply roll or other source to the bobbin or other receiving roll 17. As the bobbin or other receiving roll 17 increases in diameter, the peripheral speed of the roll 71 will be increased so as to maintain the elongate material being wound under substantially no tension or under a constant tension.

While the invention has been described in connection with a machine for spinning artificial silk, it is adapted to be used where it is desired to maintain a predetermined tension in the material as the package builds up without physically contacting the material. Wire drawing, enameling, film winding and various textile machines are examples where this type of control would be desired. As many apparently widely different embodiments of this invention may be made without departing from the spirit and scope thereof, it is to be understood that it is not to be limited to the specific embodiments described except as defined in the appended claims.

I claim:

1. In an artificial silk spinning machine, a spinneret, a driven pump for feeding spinning solution through the spinneret to form a strand, means for winding the strand into a package, and relatively fixed photosensitive means spaced from and cooperable with the wound package and controlled directly by the changing position of the surface of the wound package as the package builds up during winding for controlling the speed of the pump to maintain the desired tension in the material.

2. In a machine of the class described, means for feeding a continuous windable material to a winding station; means at the winding station for winding the material into a package; and photoelectric means fixed adjacent the package and controlled directly by the changing position of the surface of the package due to variations in the radial thickness of the wound package during winding for controlling the speed of the feeding means.

3. In an artificial silk spinning machine, means for feeding the strand, means for winding the strand into a package, means cooperable with the wound package for controlling the feed means during a portion of the winding period to vary its speed and for controlling the winding means during the remaining portion of the winding period to vary its speed.

4. In an artificial silk spinning machine, a spinneret; a pump for feeding spinning solution through the spinneret to continuously form a strand; means including a plurality of bobbins associated with the spinneret to alternately receive and wind the strand into packages; a control unit associated with each of the bobbins; means for transferring the strand alternately from bobbin to bobbin and including means for associating the control unit adjacent the bobbin being wound with the pump, said control units being adapted to control the ratio between the rate of feeding and the rate of winding in accordance with the variation in diameter of the package being wound.

5. In an artificial silk spinning machine, a spinneret, a pump for feeding spinning solution through the spinneret to form a strand, a plurality of bobbins associated with the spinneret to alternately wind the strand into packages, control means associated with each bobbin to control the speed of the pump to vary the feed of the strand in accordance with the diameter of the package being wound, means for traversing the strand on the bibbins, said means including means whereby the traverse bar may be shifted to alternately traverse the strand along one or another of the bobbins and means associated with the shifting means for rendering effective the control means associated with the bobbin being traversed.

6. In a device of the character described, means for feeding material, a plurality of means for winding the material associated with the feeding means for alternately winding up the material into packages, indicating means associated with each winding means to indicate when that winding means has acquired a predetermined size, means for shifting the feed from one winding means to the other and means included in the last named means for rendering effective the indicating means associated with the package being wound.

7. In an artificial silk spinning machine, a spinneret, pump means for feeding spinning solution through the spinneret to form a strand, a plurality of bobbins associated with the spinneret to alternately wind the strand into packages, normally inoperative indicating means associated with each bobbin and controlled by the diameter of the wound package to indicate that the bobbin being wound has acquired a predetermined size, and means for rendering the normally inoperative indicating means operable when the package associated therewith is being wound.

8. In an artificial silk spinning machine, a spinneret, pump means for feeding the spinning solution through the spinneret to form a strand, a plurality of bobbins associated with the spinneret to alternately wind the strand into packages, means for traversing the strand on the bobbins, said means including means for shifting the traverse bar to alternately traverse the strand along one or another of the bobbins, indicating means associated with each bobbin and controlled by the diameter of the package to indicate when the traverse should be shifted and means associated with the shifting means for rendering effective the control means for the indicating means associated with the bobbin being traversed.

9. In a strand or filament forming machine, means for forming and feeding a strand, means for winding the strand comprising a plurality of bobbins arranged to alternately wind up the material into packages, control means associated with each bobbin to control the speed of the forming and feeding means in accordance with the diameter of the package being wound, indicating means associated with each bobbin to indicate when the package being wound has acquired a predetermined size, means to traverse the strand along the bobbin being wound, means to shift the traverse from one package to another and means associated with the shifting means to render effective the control means and the indicating means associated with the bobbin being wound.

10. In an artificial silk machine, a spinneret, means for feeding spinning solution through the spinneret to form a strand, a motor for driving the feeding means, means for winding the strand into a package, a motor for driving the winding means, a light-sensitive cell positioned adjacent the winding means, a light-source positioned adjacent the winding means and focused on the light-sensitive cell, the growing package on the winding means intercepting the rays of light passing from the light-source to the light-sensitive cell and varying the current in the same, an amplifier connected to the light-sensitive cell for amplifying the current therein and a control device for controlling the speeds of the driving motors to maintain the desired speed ratio between the speed of feeding and the speed of winding connected to the amplifier.

11. In a device of the character described, means for forming and means for feeding the filament, means for winding the filament into a package, driving means for the feeding means, and means spaced from and cooperable with the wound package and controlled directly in accordance with the change in position of the surface of the wound package as the package builds up during winding for controlling the driving means for the feeding means to regulate the tension in the material.

12. In a device of the character described, means for winding material into a package; means for positively feeding a continuous windable material to the winding means; and photoelectric means cooperable with the package for continuously controlling the ratio between the rate of feeding and the rate of winding of the windable material, whereby the tension of the material in the package is controlled so as to form a package in which the tension in increased, decreased or maintained uniform as desired.

13. In a machine of the class described, means for winding material into a package; means for supplying windable material to the winding means; photoelectric means cooperable with the wound package and controlled by the diameter of the wound package for controlling the tension in the material during the winding period; and means associated with the photoelectric means for closing an electric circuit when the package reaches a predetermined diameter.

14. In a machine of the class described, means for winding material into a package; means associated therewith; means for supplying windable material to the winding means; photoelectric means cooperable with the wound package and controlled by the diameter of the wound package for controlling the tension in the material during the winding period; and means operative in response to operation of the photoelectric means for actuating said associated means when the package reaches a predetermined diameter.

15. In a device of the character described, means for winding material into a package; means for feeding a continuous windable material to the winding means; and electric means positioned adjacent the bobbin but spaced therefrom and controlled directly and continuously by the changing position of the surface of the package in accordance with the changing radial thickness of the package during the winding for controlling the ratio between the rate of feeding and the rate of winding of the material whereby physical contact of the control means with the material is avoided.

16. In a machine of the class described, means for feeding windable material; means for winding the material into a package; and means, including a photoelectric means, cooperable with the wound package for controlling the feeding means during a portion of the winding period to vary its speed and for controlling the winding means during another portion of the winding period to vary its speed.

17. In a device of the character described, means for winding material into a package; means for feeding windable material to the winding means; relatively stationary light-sensitive means; means for illuminating the light-sensitive means during the winding of the package and so disposed that the increasing diameter of the package decreases the illumination of the light-sensitive means; and means responsive to the amount of illumination of the light-sensitive means for controlling the ratio between the rate of feeding and the rate of winding of the material whereby the tension of the material in the package is controlled so as to form a package in which the tension is increased, decreased or maintained uniform as desired.

18. In a device of the character described, means for receiving and winding a continuous windable material with a desired tension, means sensitive to wave impingement positioned adjacent the material-receiving means; wave energy generating means disposed with relation to the receiving and winding means and means sensitive to wave impingement that variation in radial thickness of the material wound on the receiving means produces continuous variation in impingement; and means controlled by the variation in impingement on the sensitive means for controlling the tension in the material.

19. In a device of the character described, means for creating and sensing a field of energy; material-receiving means for winding the material with a desired tension disposed in said field of energy, the magnitude of sensible energy received by the sensing means being controlled by the amount and position of material wound on the receiving means; and control means operated in accordance with the magnitude of sensible energy received by the sensing means for regulating the tension in the material.

20. In a device of the character described, means for supplying windable material; means for receiving and winding the windable material with a desired tension; energy creating means adjacent the material-receiving means; energy receiving means adjacent the material-receiving means and in such position that the amount of energy received by the energy receiving means is controlled by the amount and position of the material wound upon the material-receiving means; and means controlled in accordance with the amount of energy received by the receiving means for controlling the tension in the windable material.

21. An apparatus for winding strip material comprising a reel, a motor coupled to said reel, means for varying the torque of said motor, a light source adapted to direct a beam of light across said reel, and a photo-electric relay for operating said torque-varying means, said photo-electric relay incorporating a photo-electric cell responsive to changing interception of the light beam by build-up of strip material on said reel.

22. An apparatus for handling strip material and the like, comprising a reel, a dynamo-electric machine associated with said reel, means for varying the torque of said dynamo-electric machine comprised of field varying means, photo-electric means including a light source adapted to emit light across said reel sensitive to change in radius of material on said reel, and means actuated by said photo-electric means for operating said field varying means, whereby the torque of the dynamo-electric machine may be adjusted to maintain constant tension on the material.

23. An apparatus for handling strip material and the like, comprising a reel, a dynamo-electric machine associated with said reel, means for maintaining substantially constant current in the armature of said machine, means for varying the strength of the field of said machine, and photo-electric means including a light source adapted to emit light across said reel sensitive to change in radius of strip material on said reel and operative to control said field varying means, whereby the torque of the said machine may be adjusted in direct proportion to change in strip material radius to maintain constant tension on the strip material.

24. An apparatus for handling strip material and the like, comprising a coiler, an electric motor for driving said coiler, means for maintaining substantially constant current in the armature of said motor, means for varying the strength of the motor field to maintain substantially constant tension on the strip material, and photo-electric means including a light source adapted to emit light across said reel sensitive to build-up of strip material on said coiler adapted to cause said field varying means to progressively strengthen the coiler motor field in substantially direct proportion to build up.

25. An apparatus for coiling strip material and the like, comprising a coiler, an electric motor for driving said coiler, means for varying the torque of said coiler motor including field varying means, a driving means for said field varying means, a light source adapted to direct a beam of light across said coiler, a photo-electric relay incorporating a photo-electric cell responsive to changing interception of the light beam by build-up of strip material on said coiler, and electric means connecting said photo-electric relay and said driving means, said photo-electric relay and driving means being operative to effect progressive strengthening of the coiler motor field in substantially direct proportion to build-up.

26. An apparatus for handling coil material and the like, comprising a reel, means for varying the torque on said reel, a light source adapted to direct rays of light toward the said reel to be partially intercepted by material thereon, photo-responsive means disposed to receive rays from the light source, and electrical means, said photo-responsive means adapted to affect said electrical means in response to progressive change in interception of the light rays by change in radius of material on said reel, said electrical means connecting said photo-responsive means and said torque-varying means and adapted to actuate said torque-varying means in response to variations in impulses from said photo-responsive means.

27. The process of winding elongate material comprising positively activating a supply source of the material by force applied to the supply source to provide a feed of the material, positively rotating a receiving roll to wind the elongate material from the supply source thereon, directly sensing the increase in diameter of the winding on the receiving roll as the elongate material builds up thereon by a sensing device, and utilizing the effect of the sensing operation on the sensing device to increase the speed of activation of the supply source as the diameter of the winding on the receiving roll increases to compensate for the increased peripheral speed of the receiving roll to maintain the tension on the material between the supply source and the receiving roll substantially constant.

28. The process of winding a filament comprising positively activating a supply source for said filament by force applied to the supply source to provide a feed of the filament, positively rotating a receiving roll to wind the filament thereon from the supply source, directly sensing the increase in diameter of the winding on the receiving roll as the filament builds up thereon by a sensing device, and utilizing the effect of the sensing operation on said device to increase the speed of activation of the supply source as the diameter of the winding on the receiving roll increases to compensate for the increased peripheral speed of the receiving roll to maintain the tension on the filament between the supply source and the receiving roll substantially constant.

29. The process of winding a filament comprising positively rotating a supply source for the filament by a force applied to the supply source to provide a feed of the filament, positively rotating a receiving roll to wind the filament from the supply source thereon, directly sensing the increase in diameter of the winding on the receiving roll as the filament builds up thereon by a sensing device, and increasing the speed of rotationg of the supply source in accordance with the effect on the sensing device as the diameter of the receiving roll increases to compensate for the increased peripheral speed of the receiving roll to maintain the tension on the filament between the supply source and the receiving roll substantially constant.

30. The process of winding elongate material comprising positively rotating a supply roll of the material by a force applied to the roll other than pulling upon the material to provide a feed of the material, positively rotating a receiving roll to wind the elongate material from the supply roll thereon, directly sensing the increase in diameter of the winding on the receiving roll as the elongate material builds up thereon by a sensing device and utilizing the effect of the sensing operation on the sensing device to increase the speed of rotation of the supply roll as the diameter of the receiving roll increases to compensate for the increased peripheral speed of the receiving roll to maintain the tension on the material between the supply roll and the receiving roll substantially constant.

31. An apparatus for winding elongate material comprising means for supplying said elongate material, means for driving said supply means, a receiving roll rotatably mounted to wind the elongate material from the supply means thereon, means for rotating said receiving roll, means for directly sensing the increase in diameter of the winding on the receiving roll as the elongate material builds up thereon, and means operated by the sensing means to increase the speed of operation of the driving means for the supply means as the diameter of the winding on the receiving roll increases to compensate for the increased peripheral speed of the receiving roll to maintain the tension on the material between the supply means and the receiving roll substantially constant.

32. An apparatus for winding filaments comprising means for supplying the filament, means for driving said filament supply means, a receiving roll rotatably mounted to wind the filament from the supply means thereon, means for rotating said receiving roll, means for directly sensing the increase in diameter of the winding on the receiving roll as the filament builds up thereon, and means operated by the sensing means to increase the speed of operation of the driving means for the supply means as the diameter of the winding on the receiving roll increases to compensate for the increased peripheral speed of the receiving roll to maintain the tension on the filament between the supply means and the receiving roll substantially constant.

33. An apparatus for winding filaments comprising means for rotatably supporting a supply roll of filament, means positively operable upon said supply roll supporting means for rotating the said means, a receiving roll rotatably mounted to receive the filament from the supply roll thereon, means for rotating said receiving roll, means for directly sensing the increase in diameter of the winding on the receiving roll as the filament builds up thereon, and means operated by the sensing means to increase the speed of operation of the means for rotating said supply roll as the diameter of the winding on the receiving roll increases to compensate for the increased peripheral speed of the receiving roll to maintain the tension on the filament between the supply roll and the receiving roll substantially constant.

34. An apparatus for winding elongate material comprising means for supplying said elongate material, means for advancing said elongate material from said supply means, a take-up roll rotatably mounted to wind the elongate material from the supply means thereon, means for rotating said take-up roll, means for directly sensing the increase in diameter of the winding on the take-up roll as the elongate material builds up thereon, and means operated by the sensing means to increase the speed of operation of the advancing means for the elongate material as the diameter of the winding on the take-up roll increases to compensate for the increased peripheral speed of the take-up roll to maintain the tension on the material between the supply means and the take-up roll substantially constant.

35. The process of winding elongate material comprising positively advancing a length of the material by a force other than pulling upon the material to provide a feed of the material, positively rotating a receiving roll to wind the elongate material thereon, directly sensing the displacement of the periphery of the winding on the receiving roll by a sensing device as the elongate material builds up thereon and utilizing the effect of the sensing operation on the sensing device to increase the rate of advance of the material as the diameter of the receiving roll increases to maintain the tension on said advancing elongate material substantially constant.

JAMES T. KLINE.